US010607280B2

(12) United States Patent
Takenaka

(10) Patent No.: US 10,607,280 B2
(45) Date of Patent: Mar. 31, 2020

(54) ESTIMATE PRESENTATION DEVICE, ESTIMATE PRESENTATION METHOD, PROGRAM, AND RECORDING MEDIUM

(71) Applicant: MITSUBISHI HITACHI POWER SYSTEMS, LTD., Kanagawa (JP)

(72) Inventor: Kodai Takenaka, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 397 days.

(21) Appl. No.: 15/125,736

(22) PCT Filed: Mar. 13, 2015

(86) PCT No.: PCT/JP2015/057460
§ 371 (c)(1),
(2) Date: Sep. 13, 2016

(87) PCT Pub. No.: WO2015/146629
PCT Pub. Date: Oct. 1, 2015

(65) Prior Publication Data
US 2017/0004570 A1 Jan. 5, 2017

(30) Foreign Application Priority Data
Mar. 26, 2014 (JP) ................. 2014-062853

(51) Int. Cl.
G06Q 30/06 (2012.01)
G06Q 30/02 (2012.01)
G06Q 10/06 (2012.01)
(52) U.S. Cl.
CPC ......... G06Q 30/0645 (2013.01); G06Q 10/06 (2013.01); G06Q 30/0206 (2013.01); G06Q 30/0283 (2013.01); G06Q 30/06 (2013.01)

(58) Field of Classification Search
None
See application file for complete search history.

(56) References Cited

U.S. PATENT DOCUMENTS 6,950,805 B2 * 9/2005 Kavanaugh ............ G06Q 20/10
705/35
6,963,852 B2 * 11/2005 Koresko, V ........... G06Q 40/00
705/35

(Continued)

FOREIGN PATENT DOCUMENTS

CN 1383521 12/2002
CN 1510610 7/2004

(Continued)

OTHER PUBLICATIONS

International Search Report dated Apr. 14, 2015 in International Application No. PCT/JP2015/057460 (with English translation).

(Continued)

Primary Examiner — Kirsten S Apple
(74) Attorney, Agent, or Firm — Wenderoth, Lind & Ponack, L.L.P.

(57) ABSTRACT

An estimate presentation device (110) that presents an estimate for expenses associated with a gas turbine is provided with: a lease charges estimating unit (113) that, when a lease agreement is concluded in which a component of components of the gas turbine which requires regular maintenance is to be leased as a leased component for a desired lease period, estimates lease charges for the leased component; and an estimate presenting unit (116) that presents an estimate for expenses associated with the gas turbine including the lease charges estimated by the lease charges estimating unit (113).

5 Claims, 8 Drawing Sheets

(56) References Cited

U.S. PATENT DOCUMENTS

| | | | | |
|---|---|---|---|---|
| 2002/0178129 A1* | 11/2002 | Horimoto | G06Q 30/0283 | 705/400 |
| 2003/0046199 A1* | 3/2003 | Murase | G06Q 10/10 | 705/35 |
| 2003/0105728 A1 | 6/2003 | Yano et al. | | |
| 2004/0030589 A1* | 2/2004 | Leisher | G06Q 10/10 | 705/4 |
| 2004/0199446 A1* | 10/2004 | Lange | G06Q 40/02 | 705/36 R |
| 2005/0038723 A1* | 2/2005 | Nishimaki | G06Q 40/00 | 705/35 |
| 2005/0096945 A1* | 5/2005 | Wharton, III | G06Q 40/08 | 705/4 |
| 2005/0234791 A1* | 10/2005 | Krasnerman | G06Q 40/00 | 705/35 |
| 2006/0111984 A1* | 5/2006 | Tokita | G06F 21/84 | 705/26.1 |
| 2007/0112670 A1* | 5/2007 | DeFrancesco | G06Q 20/10 | 705/38 |
| 2007/0143207 A1* | 6/2007 | Breen | G06Q 20/102 | 705/40 |
| 2007/0192239 A1* | 8/2007 | Karis | G06Q 40/00 | 705/38 |
| 2008/0109333 A1* | 5/2008 | Camp | G06Q 40/00 | 705/35 |
| 2008/0154791 A1* | 6/2008 | Bannister | G06Q 40/025 | 705/36 R |
| 2008/0270195 A1* | 10/2008 | Gottlieb | G06Q 40/08 | 705/4 |
| 2008/0288298 A1* | 11/2008 | Dattatreya | G06Q 40/00 | 705/4 |
| 2009/0099979 A1* | 4/2009 | Raghavan | G06Q 40/04 | 705/36 R |
| 2009/0248455 A1* | 10/2009 | Thompson | G06Q 40/00 | 705/4 |
| 2009/0276248 A1* | 11/2009 | Crowley | G06Q 40/02 | 705/4 |
| 2011/0071860 A1* | 3/2011 | Fontenot | G06Q 10/10 | 705/4 |
| 2011/0270772 A1* | 11/2011 | Hall | G06Q 10/20 | 705/305 |
| 2013/0159133 A1 | 6/2013 | Watanabe et al. | | |

FOREIGN PATENT DOCUMENTS

| | | |
|---|---|---|
| CN | 102473273 | 5/2012 |
| JP | 2002-183606 | 6/2002 |
| JP | 2002-195056 | 7/2002 |
| JP | 2002-256888 | 9/2002 |
| JP | 2003-050955 | 2/2003 |
| JP | 2003-108812 | 4/2003 |
| JP | 2003-331198 | 11/2003 |
| JP | 2005-004566 | 1/2005 |
| JP | 2006-293761 | 10/2006 |

OTHER PUBLICATIONS

Written Opinion of the International Searching Authority dated Apr. 14, 2015 in International Application No. PCT/JP2015/057460 (with English translation).

* cited by examiner

| GAS TURBINE ID | GAS TURBINE TYPE | COMPONENT ID | COMPONENT TYPE | LEASED COMPONENT? (YES or NO) |
|---|---|---|---|---|
| G0001 | GAS TURBINE A | P0001 | CASING | NO |
| G0001 | GAS TURBINE A | P0002 | VANE | YES |
| G0001 | GAS TURBINE A | P0003 | BEARING | YES |
| G0001 | GAS TURBINE A | P0004 | BLADE | YES |
| ... | ... | ... | ... | ... |

FIG. 2

| COMPONENT ID | COMPONENT TYPE | UNIT PRICE (YEN) | MAINTENANCE CHARGES (YEN) | DESIGN LIFE (EOH) |
|---|---|---|---|---|
| P0001 | CASING | R1 | - | - |
| P0002 | VANE | R2 | M2 | 70000 |
| P0003 | BEARING | R3 | M3 | 80000 |
| P0004 | BLADE | R4 | M4 | 50000 |
| . | . | . | . | . |
| . | . | . | . | . |
| . | . | . | . | . |

FIG. 3

| CONTRACTING PARTY ID | CONTRACTING PARTY NAME | LEASE PERIOD (EOH) | PREVIOUS COMPONENT ID | PREVIOUS COMPONENT TYPE | PREVIOUS COMPONENT UNIT PRICE (YEN) | PREVIOUS COMPONENT MAINTENANCE CHARGES (YEN) | PREVIOUS COMPONENT LEASE CHARGES (YEN) | PREVIOUS COMPONENT USAGE TIME (EOH) |
|---|---|---|---|---|---|---|---|---|
| C0001 | TARO YAMADA | 70000 | P0002 | VANE | R2 | M2 | L2 | 70000 |
| C0001 | TARO YAMADA | 70000 | P0003 | BEARING | R3 | M3 | L3 | 70000 |
| C0001 | TARO YAMADA | 70000 | P0004 | BLADE | R4 | M4 | L4 | 50000 |
| ... | ... | ... | ... | ... | ... | ... | ... | ... |

ESTIMATE PRESENTATION DEVICE, ESTIMATE PRESENTATION METHOD, PROGRAM, AND RECORDING MEDIUM

TECHNICAL FIELD

The disclosure relates to an estimate presentation device, an estimate presentation method, a program, and a recording medium. In particular, the disclosure relates to an estimate presentation device that presents an estimate for expenses associated with a gas turbine, an estimate presentation method, a program that causes a computer to function as the estimate presentation device, and a recording medium that records the program.

This application claims priority based on Japanese Patent Application No. 2014-062853 filed in Japan on Mar. 26, 2014, of which the contents are incorporated herein by reference.

BACKGROUND ART

Gas turbines are motors that support various social activities. Such gas turbines can realize a high output and a high efficiency and are thus used in jet engines for airplanes, for gas turbine single unit power generation that is compact and is good in functionality, for combined-cycle power generation that is large scale and highly efficient, and the like.

Gas turbine manufacturers are each developing a component service life management system. In such a component service life management system, an operation history, an inspection record, and a repair record of each hot part are unified in a database, and replacement, repair, and disposal thereof can be determined on the basis of an evaluation of equivalent operating hours (see Patent Document 1, for example).

CITATION LIST

Patent Document

Patent Document 1: Japanese Unexamined Patent Application Publication No. 2002-183606A

SUMMARY

Technical Problem

For some gas turbine components, a usage time is set as a component lifetime during which the performance of the component can be maintained appropriately. For such a component, when the actual usage time reaches the usage time corresponding to the component lifetime, it is preferable that the component be replaced with a new component. However, there are cases in which a user of a gas turbine continues to use the component that has reached the end of its lifetime, or does not replace the component with a manufacturer's specified component and replaces the component with a similar component that is inferior in quality and is manufactured by a so-called third party. In this way, in some cases, the component continues to be used, or is replaced with a similar component of inferior quality. As a result, for the user, not only can the predetermined performance of the gas turbine not be obtained, but also it can be difficult to maintain stable operation of the gas turbine due to failure or the like.

Here, in sales of gas turbines, there is a demand to enable a user to see any advantages of replacing a component with a manufacturer's specified component when the component has reached the end of its lifetime.

Solution to Problem

According to a first aspect of the present invention, an estimate presentation device is an estimate presentation device that presents an estimate for expenses associated with a gas turbine. The estimate presentation device includes: a lease charges estimating unit that, when a lease agreement is concluded in which a component of components of the gas turbine which requires regular maintenance is to be leased as a leased component for a desired lease period, estimates lease charges for the leased component; and an estimate presenting unit that presents an estimate for expenses associated with the gas turbine including the lease charges estimated by the lease charges estimating unit.

According to a second aspect of the present invention, in the estimate presentation device of the above-described aspect, the lease charges estimating unit may estimate the lease charges for the leased component on the basis of at least a unit price of the leased component, an index indicating a residual lifetime of the leased component, and an index indicating the desired lease period.

According to a third aspect of the present invention, in the estimate presentation device of the above-described aspects, when a lease agreement is concluded in which the desired lease period is longer than the residual lifetime of the leased component, the leased component that has reached the end of its lifetime during the lease period is replaced with a new leased component having the same price, and the lease agreement is renewed when the lease period ends, the lease charges estimating unit may estimate lease charges after the renewal of the lease agreement on the basis of at least a unit price of the leased component after the replacement, an index indicating a residual lifetime of the leased component after the replacement left at the time of the renewal, and an index indicating a desired lease period after the renewal.

According to a fourth aspect of the present invention, the estimate presentation device of the above-described aspects further includes a markdown amount calculating unit that, when a lease agreement is concluded in which the desired lease period is longer than the residual lifetime of the leased component, the leased component that has reached the end of its lifetime during the lease period is replaced with a new leased component having a different price, and the lease agreement is renewed when the lease period ends, calculates a markdown amount with respect to lease charges after the renewal on the basis of the unit price of the leased component before the replacement, an index indicating an operation period of the leased component before the replacement during the lease period up to the renewal, and the lease charges before the renewal. When a lease agreement is concluded in which the desired lease period is longer than the residual lifetime of the leased component, the leased component that has reached the end of its lifetime during the lease period is replaced with a new leased component having a different price, and the lease agreement is renewed when the lease period ends, the lease charges estimating unit may estimate lease charges after the renewal on the basis of at least a unit price of the leased component after the replacement, an index indicating a residual lifetime of the leased component after the replacement left at the time of the replacement, an index indicating a desired lease period after the renewal, an index indicating an operation period of the leased component after the replacement during the lease period up to the renewal, and a markdown amount calculated by the markdown amount calculating unit.

According to a fifth aspect of the present invention, the estimate presentation device of the above-described aspects further includes a sales price estimating unit that estimates a sales price of the leased component of the components of the gas turbine when the leased component is sold without concluding a lease agreement. The estimate presenting unit may present both a first estimate for the expenses associated with the gas turbine including the lease charges estimated by the lease charges estimating unit, and a second estimate for the expenses associated with the gas turbine including the sales price estimated by the sales price estimating unit.

According to a sixth aspect of the present invention, an estimate presentation method is a method for presenting an estimate for expenses associated with a gas turbine. The method includes: a lease charges estimating step of, when a lease agreement is concluded in which a component of components of the gas turbine which requires regular maintenance is to be leased as a leased component for a desired lease period, estimating lease charges for the leased component; and an estimate presenting step of presenting an estimate for expenses associated with the gas turbine including the lease charges estimated in the lease charges estimating step.

According to a seventh aspect of the present invention, a program causes a computer to function as an estimate presentation device that presents an estimate for expenses associated with a gas turbine. The program causes the computer to function as: a lease charges estimating unit that, when a lease agreement is concluded in which a component of components of the gas turbine which requires regular maintenance is to be leased as a leased component for a desired lease period, estimates lease charges for the leased component; and an estimate presenting unit that presents an estimate for expenses associated with the gas turbine including the lease charges estimated by the lease charges estimating unit.

According to an eighth aspect of the present invention, a recording medium records a program that causes a computer to function as an estimate presentation device that presents an estimate for expenses associated with a gas turbine. The program causes the computer to function as: a lease charges estimating unit that, when a lease agreement is concluded in which a component of components of the gas turbine which requires regular maintenance is to be leased as a leased component for a desired lease period, estimates lease charges for the leased component; and an estimate presentating unit that presents an estimate for expenses associated with the gas turbine including the lease charges estimated by the lease charges estimating unit.

Note that with respect to the features described in the above summary of the invention, a sub-combination of the features can also be an aspect of the present invention.

Advantageous Effects

According to the above-described estimate presentation device, estimate presentation method, program and recording medium, in sales of a gas turbine, a purchaser can see the advantages of replacing a component with a manufacturer's specified component when the component has reached the end of its lifetime.

BRIEF DESCRIPTION OF DRAWINGS

FIG. 2 is a diagram showing, in a table format, an example of information stored in a gas turbine information storage unit 117.

FIG. 3 is a diagram showing, in a table format, an example of information stored in a component information storage unit 118.

FIG. 4 is a diagram showing, in a table format, an example of information stored in a lease agreement information storage unit 119.

DETAILED DESCRIPTION

Below, the present invention will be explained through an embodiment of the present invention. However, the following embodiment does not limit the present invention defined by the claims. Further, all combinations of the features explained in the following embodiment are not necessarily required for the solution proposed by the present invention.

Figure 1:
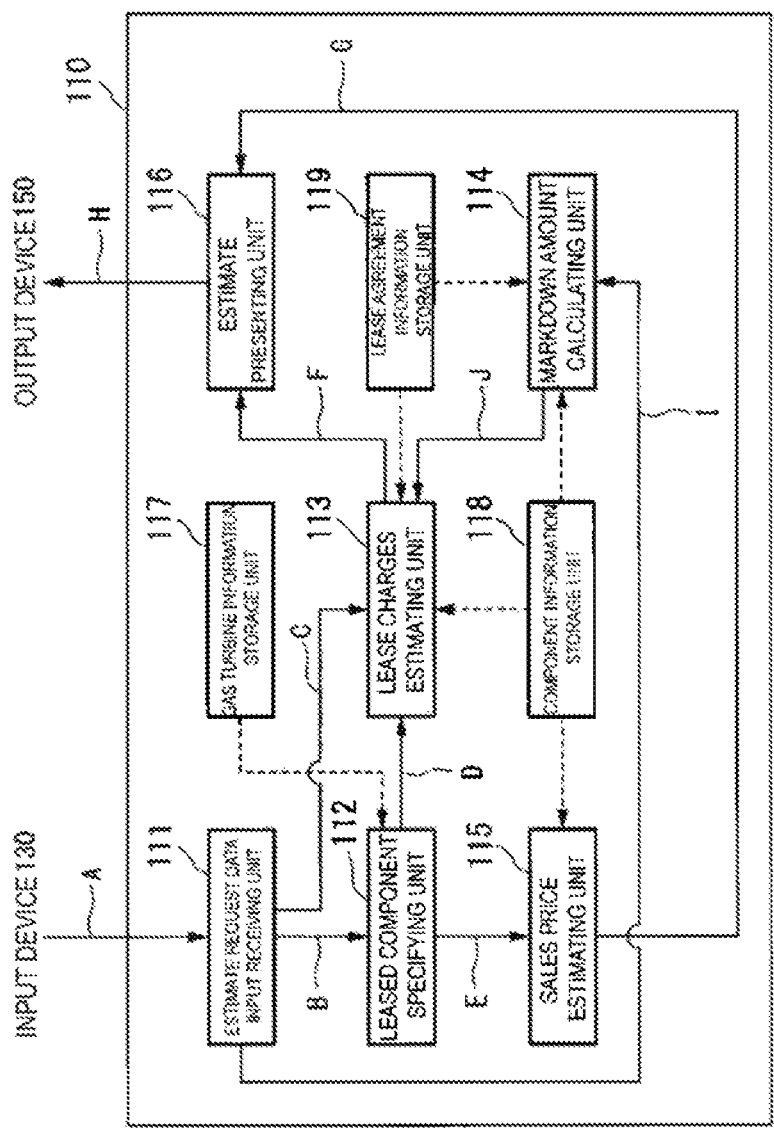
FIG. 1 is a diagram illustrating an example of a block configuration of an estimate presentation device 110 according to an embodiment.

FIG. 1 is a diagram illustrating an example of a block configuration of an estimate presentation device 110 according to an embodiment.

The estimate presentation device 110 is a computer that presents an estimate for expenses associated with a gas turbine. Here, the gas turbine is a gas engine in which gas that is sucked in is compressed to a high pressure by a compressor; fuel is injected into the compressed gas to combust and heat the mixture, which generates high-temperature, high-pressure gas; the high-temperature, high-pressure gas is guided to the turbine, which causes the turbine to rotate, and power generated by the turbine is extracted to the outside. Further, the estimate for the expenses associated with the gas turbine refers to an estimate for the expenses associated with the gas turbine including lease charges for a leased component when a lease agreement is concluded in which a component of the components of the gas turbine which requires regular maintenance is to be leased as a leased component for a desired lease period.

The estimate presentation device 110 is electrically connected to an input device 130 and an output device 150. Here, the input device 130 is a device for inputting data, information, instructions, and the like to a computer. Further, the output device 150 is a device that receives data, information, and the like from the computer, and presents the data, information, and the like in a format that can be recognized by a person.

When the estimate presentation device 110 receives, from the input device 130, data indicating information on a request for an estimate for the expenses associated with the gas turbine, the estimate presentation device 110 estimates the lease charges for the leased component. Then, the estimate presentation device 110 outputs, to the output device 150, data presenting the estimate for the expenses associated with the gas turbine, including the estimated lease charges.

Note that, in the present embodiment, for sake of simplicity, an explanation is given of a configuration in which the estimate presentation device 110 is electrically connected to one input device 130 and one output device 150, but this is one example. The estimate presentation device 110 may be electrically connected to pluralities of the input devices 130 and the output devices 150.

The estimate presentation device 110 is provided with an estimate request data input receiving unit 111, a leased component specifying unit 112, a lease charges estimating unit 113, a markdown amount calculating unit 114, a sales price estimating unit 115, an estimate presenting unit 116, a gas turbine information storage unit 117, a component information storage unit 118, and a lease agreement information storage unit 119. In the explanation below, the function and operation of each constituent are described in detail.

The estimate request data input receiving unit 111 is a module that receives data indicating information necessary to request the estimate for the expenses associated with the gas turbine.

The leased component specifying unit 112 is a module that specifies a component of the components of the gas turbine which requires regular maintenance as a leased component.

The lease charges estimating unit 113 is a module that estimates the lease charges of a leased component when the lease agreement is concluded in which a component of the components of the gas turbine which requires regular maintenance is to be leased as a leased component for a desired lease period. For example, the lease charges estimating unit 113 may be configured to estimate the lease charges for the leased component on the basis of at least a unit price of the leased component, an index indicating a residual lifetime of the leased component, and an index indicating the desired lease period. Further, for example, the lease charges estimating unit 113 may be configured such that, when a lease agreement is concluded in which a desired lease period is longer than the residual lifetime of the leased component, the leased component that has reached the end of its lifetime during the lease period is replaced with a new leased component having the same price, and the lease agreement is renewed when the lease period ends, the lease charges estimating unit 113 estimates the lease charges after the renewal of the lease agreement on the basis of at least the unit price of the leased component after the replacement, an index indicating the residual lifetime of the leased component after the replacement left at the time of the renewal, and an index indicating the desired lease period after the renewal. Further, for example, the lease charges estimating unit 113 may be configured such that, when a lease agreement is concluded in which a desired lease period is longer than the residual lifetime of the leased component, the leased component that has reached the end of its lifetime during the lease period is replaced with a new leased component having a different price, and the lease agreement is renewed when the lease period ends, the lease charges estimating unit 113 estimates the lease charges after the renewal on the basis of at least the unit price of the leased component after the replacement, an index indicating the residual lifetime of the leased component after the replacement left at the time of the replacement, an index indicating the desired lease period after the renewal, an index indicating an operation period of the leased component after the replacement during the lease period up to the renewal, and a markdown amount calculated by the markdown amount calculating unit 114.

The markdown amount calculating unit 114 is a module that, when a lease agreement is concluded in which the desired lease period is longer than the residual lifetime of the leased component, the leased component that has reached the end of its lifetime during the lease period is replaced with a new leased component having a different price, and the lease agreement is renewed when the lease period ends, calculates a markdown amount with respect to the lease charges after the renewal, on the basis of the unit price of the leased component before the replacement, an index indicating the operation period of the leased component before the replacement during the lease period up to the renewal, and the lease charges before the renewal.

The sales price estimating unit 115 is a module that estimates a sales price of the leased component of the components of the gas turbine when the leased component is to be sold without concluding a lease agreement.

The estimate presenting unit 116 is a module that presents the estimate for the expenses associated with the gas turbine including the lease charges estimated by the lease charges estimating unit 113. For example, the estimate presenting unit 116 may be configured to present both a first estimate for the expenses associated with the gas turbine including the lease charges estimated by the lease charges estimating unit 113, and a second estimate for the expenses associated with the gas turbine including the sales price estimated by the sales price estimating unit 115.

The gas turbine information storage unit 117 is a table storing information on components of a plurality of types of gas turbines.

The component information storage unit 118 is a table storing information on a plurality of types of components of gas turbines.

The lease agreement information storage unit 119 is a table storing information on a plurality of lease agreements.

FIG. 2 is a diagram showing, in a table format, an example of information stored in the gas turbine information storage unit 117. Various pieces of information, including a gas turbine identifier (ID), a gas turbine type, a component ID, a component type, and "leased component? (YES or NO)" information, are stored in association with each other in the gas turbine information storage unit 117.

The gas turbine ID information is an identification code for uniquely identifying each one of the plurality of types of gas turbines.

The gas turbine type information indicates the type of a gas turbine identified by the gas turbine ID. For instance, the example given here shows that the type of a gas turbine identified by the gas turbine ID of G0001 is a gas turbine A.

The component ID information is an identification code for uniquely identifying each one of the plurality of types of components of the gas turbines.

The component type information indicates the type of a component that is a component of a gas turbine identified by the gas turbine ID and that is a component identified by the component ID. For instance, this example shows that the type of a component that is a component of the gas turbine A identified by the gas turbine ID of G0001 and that is a component identified by the component ID of P0001 is a casing.

The "leased component? (YES or NO)" information indicates whether or not a component that is a component of a gas turbine identified by the gas turbine ID and that is a component identified by the component ID is a leased component. For instance, this example shows that a casing that is a component of the gas turbine A identified by the gas turbine ID of G0001 and that is identified by the component ID of P0001 is not a leased component. Further, this example shows that a vane that is a component of the gas turbine A identified by the gas turbine ID of G0001 and that is identified by the component ID of P0002 is a leased component.

Each of these pieces of information can be newly registered when selling the gas turbine of which a component which requires regular maintenance is leased as a leased component.

FIG. 3 is a diagram showing, in a table format, an example of information stored in the component information storage unit 118. Various pieces of information, including the component ID, the component type, a unit price (yen), maintenance charges (yen), and a design life (EOH) are stored in association with each other in the component information storage unit 118.

The component ID information is the same as the component ID information stored in the gas turbine information storage unit 117. Further, the component type information is the same as the component type information stored in the gas turbine information storage unit 117.

The unit price (yen) information indicates a unit price (yen) of the component identified by the component ID. For instance, this example shows that the unit price of the casing identified by the component ID of P0001 is R1 (yen).

The maintenance charges (yen) information indicates maintenance charges (yen) for the component identified by the component ID. For instance, this example shows that maintenance charges for the casing identified by the component ID of P0001 are not set. Further, this example shows that maintenance charges for the vane identified by the component ID of P0002 are M2 (yen).

The design life (EOH) information indicates the design life of the component identified by the component ID, expressed as equivalent operating hours (EOH). For instance, this example shows that the design life (EOH) of the casing identified by the component ID of P0001 is not set. Furthermore, this example shows that the design life (EOH) of the vane identified by the component ID of P0002 is 70,000 (EOH). Note that the component of which the design life (EOH) is not set is an example of a component that is not a "leased component" in the present invention. Further, the component of which the design life (EOH) is set is an example of a component that is a "leased component" in the present invention. In addition, the design life (EOH) is an example of "index indicating a residual lifetime" in the present embodiment when a component is new.

Each of these pieces of information can be newly registered when selling the gas turbine of which a component which requires regular maintenance is leased as a leased component. The unit price (yen) information can be updated when the unit price of the component is changed. The design life (EOH) information can be updated as necessary on the basis of damage to an actual device.

FIG. 4 is a diagram showing, in a table format, an example of information stored in the lease agreement information storage unit 119. Various pieces of information, including a contracting party ID, a contracting party name, the lease period (EOH), a previous component ID, a previous component type, a previous component unit price (yen), previous component maintenance charges (yen), previous component lease charges (yen), a previous component usage time (EOH), and "Has component been replaced? (YES or NO)" information, are stored in association with each other in the lease agreement information storage unit 119.

The contracting party ID information is an identification code for uniquely identifying each one of a plurality of contracting parties having lease agreements for leased components.

The contracting party name information indicates the name of a contracting party identified by the contracting party ID. For instance, this example shows that the name of the contracting party identified by the contracting party ID of C0001 is Taro Yamada.

The lease period (EOH) information indicates the lease period during which the contracting party identified by the contracting party ID has an agreement, expressed as the equivalent operating hours (EOH). For instance, this example shows that the lease period during which Taro Yamada identified by the contracting party ID of C0001 had an agreement is 70,000 (EOH).

The previous component ID information is an identification code for uniquely identifying the leased component used by the contracting party identified by the contracting party ID from the time of conclusion of the lease agreement.

The previous component type information indicates the type of the leased component identified by the previous component ID that has been used by the contracting party identified by the contracting party ID from the time of conclusion of the lease agreement. For instance, this example shows that the type of the leased component identified by the previous component ID of P0002 that has been used by Taro Yamada identified by the contracting party ID of C0001 from the time of conclusion of the lease agreement is a vane.

The previous component unit price (yen) information indicates the unit price (yen) of the leased component identified by the previous component ID that has been used by the contracting party identified by the contracting party ID from the time of conclusion of the lease agreement. For instance, this example shows that the unit price (yen) of the vane identified by the previous component ID of P0002 that is the leased component having been used by Taro Yamada identified by the contracting party ID of C0001 from the time of conclusion of the lease agreement is R2 (yen).

The previous component maintenance charges (yen) information indicates the maintenance charges (yen) of the leased component identified by the previous component ID that is a leased component having been used by the contracting party identified by the contracting party ID from the time of conclusion of the lease agreement. For instance, this example shows that the maintenance charges (yen) of the vane identified by the previous component ID of P0002 that is the leased component having been used by Taro Yamada identified by the contracting party ID of C0001 from the time of conclusion of the lease agreement is M2 (yen).

The previous component lease charges (yen) information indicates the lease charge (yen) of the leased component that has been used by the contracting party identified by the contracting party ID from the time of conclusion of the lease agreement and that is identified by the previous component ID. Specifically, this example shows that the lease charge (yen) of the vane that is the leased component having been used by Taro Yamada identified by the contracting party ID of C0001 from the time of conclusion of the lease agreement and that is identified by the previous component ID of P0002 is L2 (yen).

The previous component usage time (EOH) information indicates the usage time, expressed as equivalent operating hours (EOH), of the leased component that has been used by the contracting party identified by the contracting party ID from the time of conclusion of the lease agreement and that is identified by the previous component ID. For instance, this example shows that the usage time (EOH) of the vane that is the leased component having been used by Taro Yamada identified by the contracting party ID of C0001 from the time of conclusion of the lease agreement and that is identified by the previous component ID of P0002 is 70,000 (EOH). It should be noted that the previous component usage time (EOH) information is an example of "index indicating the operation period of the leased component before the replacement during the lease period up to the renewal" in the present embodiment.

The "Has component been replaced? (YES or NO)" information indicates whether or not the leased component that has been used by the contracting party identified by the contracting party ID from the time of conclusion of the lease agreement and that is identified by the previous component ID has been replaced. For instance, this example shows that the "Has component been replaced? (YES or NO)" information on a vane that is the leased component having been used by Taro Yamada identified by the contracting party ID of C0001 from the time of conclusion of the lease agreement and that is identified by the previous component ID of P0002 is NO, indicating that the vane has not been replaced. For instance, this example shows that the "Has component been replaced? (YES or NO)" information on a blade that is the leased component having been used by Taro Yamada identified by the contracting party ID of C0001 from the time of conclusion of the lease agreement and that is identified by the previous component ID of P0004 is YES, indicating that the blade has been replaced.

Each of these pieces of information can be newly registered when the lease agreement is concluded, for example. Further, each of the previous component usage time (EOH) and the "Has component been replaced? (YES or NO)" information can be updated when a corresponding leased component is replaced during the lease period, or when a lease estimate is requested for the renewal of the lease agreement for the corresponding leased component. For example, the previous component usage time (EOH) information may be input via the input device, or data output from a control device of the gas turbine may be input as the previous component usage time (EOH) information. Here, the control device of the gas turbine is a computer provided with a gas turbine startup sequence control function, a stop sequence control function, a logic control function, a monitoring function, and a protecting function.

Figures 5, 6:
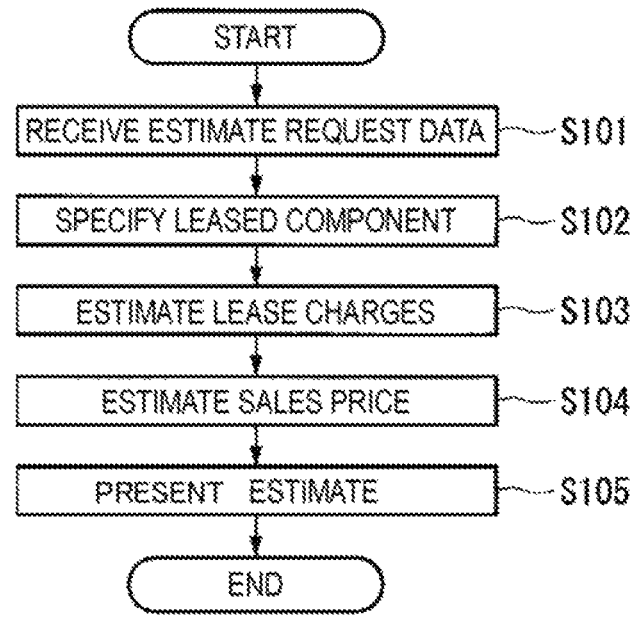
FIG. 5 is a diagram illustrating an example of an operation flow of the estimate presentation device 110.
FIG. 6 is a diagram illustrating an example of a display screen S1 for inputting information necessary to request an estimate for expenses associated with a gas turbine, in sales of the gas turbine.

FIG. 5 is a diagram illustrating an example of an operation flow of the estimate presentation device 110. In the explanation of the operation flow, processing for estimating the lease charges for a leased component and presenting the estimate for the expenses associated with the gas turbine, including the lease charges, when a lease agreement is concluded in which a component of the components of the gas turbine which requires regular maintenance is to be leased as a leased component for a desired lease period, in sales of a gas turbine, will be described in detail with reference also to FIGS. 1 to 4.

For example, when a gas turbine vendor concludes a lease agreement in which a component of the components of a gas turbine which requires regular maintenance is to be leased as a leased component for a desired lease period, in sales of the gas turbine, the gas turbine vendor uses the estimate presentation device 110 to present the estimate for expenses associated with the gas turbine, including the estimate for the lease charges for the leased component. As the information necessary to request the estimate for the expenses associated with the gas turbine, the vendor at least acquires, from a customer considering purchase of the gas turbine, information indicating the desired type of the gas turbine, and information for concluding the lease agreement for the leased component. The vendor inputs the information indicating the desired type of the gas turbine, and the information for concluding the lease agreement for the leased component into the estimate presentation device 110 via the input device 130. The information for concluding the lease agreement for the leased component includes at least information on an index indicating the desired lease period. For example, as the information on the index indicating the desired lease period, the vendor acquires, from the customer, information indicating the desired lease period expressed as equivalent operating hours (EOH). The vendor inputs the desired lease period information into the estimate presentation device 110 via the input device 130. Further, the information for concluding the lease agreement for the leased component may include information specifying a leased component of a plurality of types of the leased components for which the estimate of the lease charges is requested.

FIG. 6 is a diagram illustrating an example of a display screen S1 for inputting the information necessary to request the estimate for expenses associated with the gas turbine in sales of the gas turbine. Check boxes C1 to C7, a text box T1, and a button B1 are included in the display screen S1. Here, the check boxes C1 to C7 are small squares that appear in a window on an operation screen of a graphic user interface (GUI), and constitute a user interface used to indicate one's intension, "YES" or "NO", by entering or omitting a check mark. Further, the text box T1 appears in the window on the operation screen of the GUI, and constitutes a user interface of an area for the input of character information. Further, the button B1 appears in the window on the operation screen of the GUI, and constitutes a user interface that activates a particular action, defined for each click of the button B1, by being depressed in a similar manner to depressing a switch in the actual world.

The check boxes C1 and C2 constitute a user interface for selecting the desired type of the gas turbine. For instance, this example shows that the check box C1 is a user interface for selecting the gas turbine A as the desired type of the gas turbine. The check boxes C3 to C7 constitute a user interface for specifying the leased component for which the estimate of the lease charges is requested. For instance, this example shows that the check box C3 is a user interface for selecting a vane as the leased component for which the estimate of the lease charges is requested. The text box T1 is a user interface for inputting the desired lease period, expressed as equivalent operating hours (EOH). The button B1 is a button for confirming input information.

For example, the estimate presentation device 110 displays the display screen S1 on a display, which is the output device 150. When inputting the information indicating the desired type of the gas turbine, for example, the vendor operates the input device 130 to enter a check mark in the check box C1 or the check box C2. Further, when specifying the leased component for which the estimate of the lease charges is requested, for example, the vendor operates the input device 130 to enter a check mark in the check boxes C3 to C7. Further, the vendor operates the input device 130 to input the equivalent operating hours (EOH), indicating the desired lease period, into the text box T1. Then, via the input device 130, the vendor depresses the button B1 to confirm the input information.

When these types of operations are performed, the estimate request data input receiving unit 111 of the estimate presentation device 110 receives data A indicating the information necessary to request an estimate for the expenses associated with the gas turbine (step S101). Then, from among the pieces of information included in the data A, the estimate request data input receiving unit 111 transmits, to the leased component specifying unit 112, data B indicating the information on the desired type of the gas turbine and the information on the leased component for which the estimate of the lease charges is desired. Further, from among the pieces of information included in the data thus received, the estimate presentation device 110 transmits, to the lease charges estimating unit 113, data C indicating the equivalent operating hours (EOH) information, which indicates the desired lease period.

When the leased component specifying unit 112 of the estimate presentation device 110 receives the data B from the estimate request data input receiving unit 111, the leased component specifying unit 112 refers to the information stored in the gas turbine information storage unit 117 to specify the leased component (step S102). For instance, in this example, the leased component specifying unit 112 refers to the information stored in the gas turbine information storage unit 117 to specify, from among the pieces of information on the types of components associated with the desired type of the gas turbine indicated by the data B, the information on the type corresponding to the leased component for which the estimate of the lease charges is requested as indicated by the data B. Further, for example, when the information on the leased component for which the estimate of the lease charges is requested is not included in the data B, the leased component specifying unit 112 may refer to the information stored in the gas turbine information storage unit 117 to specify, from among the pieces of information on the types of components associated with the desired type of the gas turbine indicated by the data B, the information on the type of the component for which the "leased component? (YES or NO)" information is YES. Then, the leased component specifying unit 112 refers to the information stored in the gas turbine information storage unit 117, and transmits data D, which indicates information on the component ID associated with the type of the specified component, to the lease charges estimating unit 113. In a similar manner, the leased component specifying unit 112 transmits data E, which indicates the information on the component ID associated with the type of the specified component, to the sales price estimating unit 115.

When receiving the data C from the estimate request data input receiving unit 111 and the data D from the leased component specifying unit 112, the lease charges estimating unit 113 of the estimate presentation device 110 refers to the information stored in the component information storage unit 118 and estimates the lease charges of the leased component (step S103). For instance, in this example, the lease charges estimating unit 113 refers to the information stored in the component information storage unit 118 and reads information on the unit price (yen) and the design life (EOH) associated with the component ID information indicated by the data D. Then, on the basis of the information on the unit price (yen) and the design life (EOH) read from the component information storage unit 118 and of the information on the equivalent operating hours (EOH) indicating the desired lease period indicated by the data C, the lease charges estimating unit 113 estimates the lease charges of the leased component. For example, the lease charges estimating unit 113 uses a function such as Expression 1 to estimate lease charges L of the leased component. In the function of Expression 1, L is the lease charges of the leased component. R is the unit price (yen) of the leased component. M is the maintenance charges (yen) of the leased component. T1 is the design life (EOH) of the leased component. T2 is the equivalent operating hours (EOH) indicating the desired lease period.

Expression 1

$$L = \frac{R+M}{T1} \times T2 \qquad (1)$$

Further, for example, if a table is prepared in advance in which the unit price (yen), the design life (EOH), the equivalent operating hours (EOH) indicating the desired lease period, and the lease charges (yen) of the leased component are stored in association with each other, the lease charges estimating unit 113 may estimate the lease charges (yen) by referring to this type of table. Further, for example, when there are a plurality of the leased components, the lease charges estimating unit 113 estimates the lease charges for each of the leased components individually. Then, the lease charges estimating unit 113 transmits, to the estimate presenting unit 116, data F indicating the estimated lease charges for the leased component.

When the sales price estimating unit 115 of the estimate presentation device 110 receives the data E transmitted from the leased component specifying unit 112, the sales price estimating unit 115 refers to the information stored in the component information storage unit 118 and estimates a sales price when a corresponding leased component is to be sold without the lease agreement (step S104). For example, the sales price estimating unit 115 refers to the information stored in the component information storage unit 118 and reads information on the unit price (yen) and the maintenance charges (yen) associated with the component ID information indicated by the data E. Then, for example, the sales price estimating unit 115 sets the sales price by adding, to the unit price of the leased component indicated by the unit price (yen) information read from the component information storage unit 118, the maintenance charges of the leased component indicated by the maintenance charges (yen) information read from the component information storage unit 118. Further, the sales price estimating unit 115 may be configured to further estimate the sales price of components other than the leased component. Then, the sales price estimating unit 115 transmits, to the estimate presenting unit 116, data G indicating the estimated sales price (yen).

When receiving the data F from the lease charges estimating unit 113 and the data G from the sales price estimating unit 115, the estimate presenting unit 116 of the estimate presentation device 110 generates data H presenting the estimate for the expenses associated with the gas turbine including the lease charges estimated by the lease charges estimating unit 113 and outputs the data H to the output device 150 (step S105). For example, the estimate presenting unit 116 presents the estimate for the lease charges indicated by the data F with respect to the leased component for which the estimate of the lease charges has been requested. Further, for example, in addition to the estimate for the lease charges indicated by the data F, the estimate presentating unit 116 may also present the sales price (yen) indicated by the data G, for the leased component for which the estimate of the lease charges has been requested. Further, in either of the above cases, with respect to the components other than the leased component for which the estimate of the lease charges has been requested, the estimate presenting unit 116 may be configured to present the sales price (yen) indicated by the data G or may be configured not to present the sales price (yen) indicated by the data G.

In this way, the customer considering the purchase of the gas turbine can determine whether or not to conclude a lease agreement for a component of the components of the gas turbine which requires regular maintenance as a leased component by referring to the information presented on an output device 140.

Figure 7:
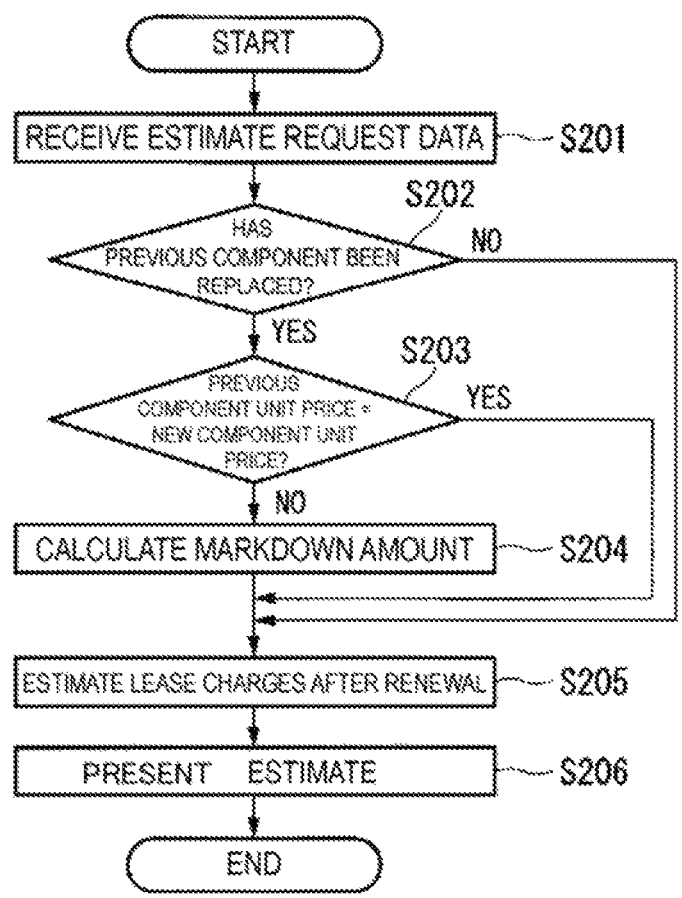
FIG. 7 is a diagram illustrating another example of the operation flow of the estimate presentation device 110.

FIG. 7 is a diagram illustrating another example of the operation flow of the estimate presentation device 110. In the explanation of this operation flow, with reference also to FIGS. 1 to 6, processing will be described in detail in which, when the lease agreement for the leased component of the components of the sold gas turbine is renewed, the lease charges for the leased component after the renewal are estimated, and the estimate for the expenses associated with the gas turbine including the lease charges is presented.

For example, when the lease agreement for the leased component of the components of the sold gas turbine is renewed, the gas turbine vendor uses the estimate presentation device 110 to present the estimate for the expenses associated with the gas turbine including the lease charges for the leased component after renewal. As the information necessary to request an estimate for the expenses associated with the gas turbine, the vendor at least inputs information that can specify the customer renewing the lease agreement for the leased component, and information on an index indicating the desired lease period after renewal, into the estimate presentation device 110 via the input device 130.

Figure 8:
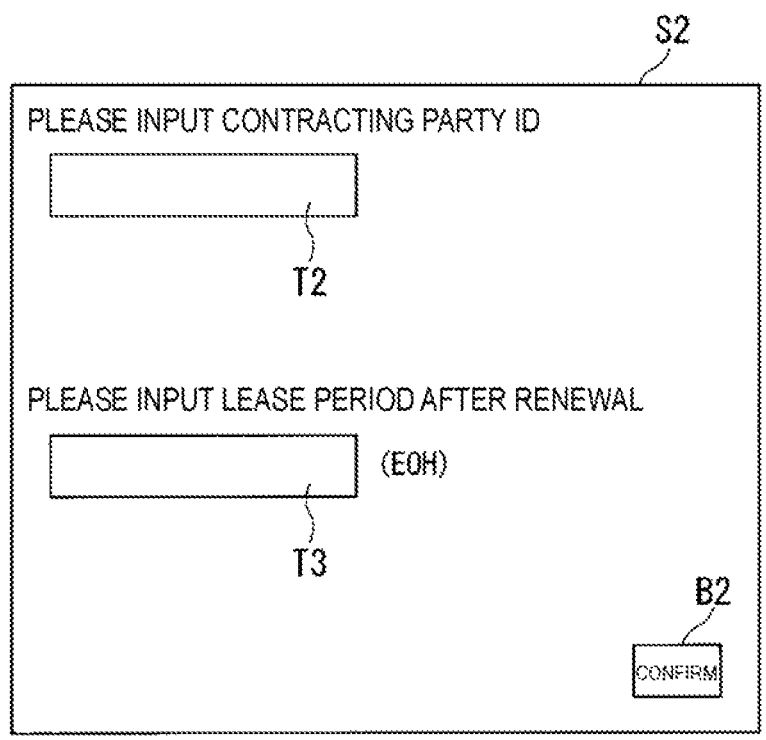
FIG. 8 is a diagram illustrating an example of a display screen S2 for inputting information necessary to request an estimate for expenses associated with a gas turbine, when renewing a lease agreement of a leased component.

FIG. 8 is a diagram illustrating an example of a display screen S2 for inputting information necessary to request an estimate for expenses associated with the gas turbine when renewing the lease agreement for the leased component. Text boxes T2 and T3, and a button B2 are included in the display screen S2.

The text box T2 is a user interface for inputting the contracting party ID. The text box T3 is a user interface for inputting the desired lease period after renewal of the lease agreement, expressed as equivalent operating hours (EOH). The button B2 is a button for confirming input information.

For example, the estimate presentation device 110 displays the display screen S2 on the display that is the output device 150. The vendor operates the input device 130 to input the contracting party ID of the customer renewing the lease agreement for the leased component into the text box T2. Further, the vendor operates the input device 130 to input the equivalent operating hours (EOH) indicating the desired lease period after renewal of the lease agreement into the text box T3. Then, the vendor depresses the button B2 via the input device 130 to confirm the input information.

When these types of operations are performed, the estimate request data input receiving unit 111 of the estimate presentation device 110 receives the data A indicating the information necessary to request the estimate for the expenses associated with the gas turbine (step S201). Then, from among the pieces of information included in the data A, the estimate request data input receiving unit 111 transmits, to the lease charges estimating unit 113, the data C indicating the contracting party ID information and the equivalent operating hours (EOH) information, which indicates the desired lease period after renewal of the lease agreement. Further, from among the pieces of information included in the data A, the estimate request data input receiving unit 111 transmits, to the markdown amount calculating unit 114, data I indicating the contracting party ID information.

When receiving the data I from the estimate request data input receiving unit 111, the markdown amount calculating unit 114 of the estimate presentation device 110 refers to the information stored in the lease agreement information storage unit 119 and reads the "Has component been replaced? (YES or NO)" information associated with the contracting party ID information indicated by the data I. The markdown amount calculating unit 114 then determines, for each of the previous components for which the contracting party identified by the contracting party ID has the lease agreement, whether or not the previous component has been replaced during the lease period (step S202). Here, if the previous component has not been replaced during the lease period, this means that, in the previous lease agreement, a lease agreement has been concluded in which the lease period is shorter than the design life (EOH) of that leased component. On the other hand, if the previous component has been replaced during the lease period, this means that, in the previous lease agreement, a lease agreement has been concluded in which the lease period is longer than the design life (EOH) of that leased component.

When it is determined at step S202 that the previous component has not been replaced during the lease period (NO at step S202), the markdown amount calculating unit 114 does not calculate a markdown amount with respect to the lease charges of that leased component after renewal.

When it is determined at step S202 that the previous component has been replaced during the lease period (YES at step S202), the markdown amount calculating unit 114 refers to the information stored in the component information storage unit 118 and the information stored in the lease agreement information storage unit 119 and determines whether or not the unit price of the previous component is the same as the unit price of the new component (step S203). Here, when the unit price of the previous component is not the same as the unit price of the new component, if the unit price of the previous component is higher, higher lease charges than the appropriate lease charges may have been paid with respect to the period after replacement of the leased component during the previous lease period. If the unit price of the new component is higher, cheaper lease charges than the appropriate lease charges may have been paid with respect to the period after replacement of the leased component during the previous lease period. As a result, when the unit price of the previous component is not the same as the unit price of the new component, the lease charges for that leased component after renewal need to be adjusted such that total charges of the lease charges before renewal and the lease charges after renewal are adjusted to be the appropriate charges. The following processing is to be executed for such a purpose.

When it is determined at step S203 that the unit price of the previous component and the unit price of the new component are the same (YES at step S203), the markdown amount calculating unit 114 does not calculate the markdown amount with respect to the lease charges of the leased component after renewal.

When it is determined at step S203 that the unit price of the previous component and the unit price of the new component are not the same (NO at step S203), the markdown amount calculating unit 114 refers to the information stored in the lease agreement information storage unit 119 and calculates the markdown amount with respect to the lease charges of the leased component after renewal (step S204). For example, the markdown amount calculating unit 114 uses a function such as Expression 2 to calculate the markdown amount. In the function of Expression 2, P is the markdown amount. L is the lease charges (yen) of the previous component. R is the unit price (yen) of the previous component. M is the maintenance charges (yen) of the previous component. T1 is the design life (EOH) of the previous component. T3 is information indicating the usage time (EOH) of the previous component. In Expression 2, the appropriate lease charges corresponding to the usage time (EOH) of the previous component are subtracted from the lease charges before renewal.

Expression 2

$$P = L - \frac{R+M}{T1} \times T3 \qquad (2)$$

Further, for example, if a table is prepared in advance in which the lease charges (yen) of the previous component, the unit price (yen) of the previous component, the maintenance charges (yen) of the previous component, the design life (EOH) of the previous component, the usage time (EOH) of the previous component, and the markdown amount (yen) are stored in association with each other, the markdown amount calculating unit 114 may calculate the markdown amount (yen) by referring to this type of table. Further, for example, when there are a plurality of the leased components that have been replaced with new components having a different unit price during the lease period before renewal, the markdown amount calculating unit 114 calculates the respective markdown amounts with respect to the lease charges for the leased components after renewal. Then, the markdown amount calculating unit 114 transmits data J, which indicates the calculated markdown amount and the component ID identifying the leased component for which the markdown amount has been calculated, to the lease charges estimating unit 113. Further, when the markdown amount calculating unit 114 has not calculated the markdown amount, the markdown amount calculating unit 114 transmits the data J indicating that the markdown amount is zero (yen) to the lease charges estimating unit 113.

When receiving the data C from the estimate request data input receiving unit 111 and the data J from the markdown amount calculating unit 114, the lease charges estimating unit 113 of the estimate presentation device 110 refers to the information stored in the component information storage unit 118 and the information stored in the lease agreement information storage unit 119 and estimates the lease charges of the leased component after renewal (step S205). For example, in the case of this example, the lease charges estimating unit 113 refers to the information stored in the component information storage unit 118 and reads the unit price (yen) information, the maintenance charges (yen) information, and the design life (EOH) information associated with the component ID indicated by the data J. Further, the lease charges estimating unit 113 refers to the information stored in the lease agreement information storage unit 119 and reads the lease period (EOH) information and the previous component usage time (EOH) information associated with the contracting party ID indicated by the data C and the component ID indicated by the data J. Then, on the basis of the unit price (yen) information, the maintenance charges (yen) information, and the design life (EOH) information read from the component information storage unit 118, the information on the lease period (EOH) and the previous component usage time (EOH) read from the lease agreement information storage unit 119, and the information on the equivalent operating hours (EOH) indicating the desired lease period after renewal indicated by the data C, the lease charges estimating unit 113 estimates the lease charges for the leased component after renewal. For example, the lease charges estimating unit 113 uses a function such as Expression 3 and estimates the lease charges for the leased component after renewal. In the function of Expression 3, L is the lease charges (yen) of the leased component after renewal. R is the unit price (yen) of the new component. M is the maintenance charges (yen) of the new component. T1 is the design life (EOH) of the new component at the time of replacement of the leased component. T4 is the lease period (EOH) of the agreement before renewal. T3 is the usage time (EOH) of the previous component within the lease agreement period before renewal. T2 is the desired lease period (EOH) after renewal. P is the markdown amount (yen). Here, T4−T3 refers to the usage time (EOH) of the new component during the lease period before renewal. Thus, in Expression 3, the appropriate lease charges paid in accordance with the usage time (EOH) of the previous component are subtracted from the total charges obtained by adding the lease charges corresponding to the period (EOH) from when the previous component is replaced with the new component to when the desired lease period (EOH) after renewal ends to the lease charges before renewal.

Expression 3

$$L = \frac{R+M}{T1} \times (T4 - T3 + T2) - P \qquad (3)$$

Further, for example, if a table is prepared in advance in which the unit price (yen) of the new component, the maintenance charges (yen) of the new component, the design life (EOH) of the new component at the time of replacement of the leased component, the lease period (EOH) of the agreement before renewal, the usage time (EOH) of the previous component during the lease agreement period before renewal, the desired lease period (EOH) after renewal, the markdown amount (yen), and the lease charges of the leased component after renewal are stored in association with each other, the lease charges estimating unit 113 may estimate the lease charges (yen) of the leased component after renewal by referring to this type of table. Further, for example, when there are a plurality of the leased components for which the lease agreement is concluded, the lease charges estimating unit 113 may individually estimate the lease charges for the leased components after renewal. Then, the lease charges estimating unit 113 transmits, to the estimate presenting unit 116, the data F indicating the estimated lease charges for the leased component after renewal.

When receiving the data F from the lease charges estimating unit 113, the estimate presenting unit 116 of the estimate presentation device 110 generates data presenting the estimate for the expenses associated with the gas turbine including the lease charges after renewal estimated by the lease charges estimating unit 113, and outputs the data to the output device 150 (step S206).

In this way, the customer considering the renewal of the lease agreement for the leased component can determine whether or not to renew the lease agreement by referring to the information presented on the output device 140.

As described above, when the lease agreement is concluded in which a component of the components of the gas turbine which requires regular maintenance is to be leased as a leased component for a desired lease period, the estimate presentation device 110 estimates the lease charges of the leased component. Then, the estimate presentation device 110 presents the estimate for the expenses associated with the gas turbine including the estimated lease charges.

According to this configuration, in sales of a gas turbine, the purchaser can see the advantages of replacing a component with a manufacturer's specified component when the component has reached the end of its lifetime.

Further, the estimate presentation device 110 estimates the lease charges for the leased component on the basis of at least the unit price of the leased component, the index indicating the residual lifetime of the leased component, and the index indicating the desired lease period.

This configuration enables appropriate lease charges corresponding to a desired lease period to be estimated.

Further, when the lease agreement is concluded in which the desired lease period is longer than the residual lifetime of the leased component, the leased component that has reached the end of its lifetime during the lease period is replaced with a new leased component having the same price, and the lease agreement is renewed when the lease period ends, the estimate presentation device 110 estimates the lease charges after the renewal of the lease agreement on the basis of at least the unit price of the leased component after the replacement, the index indicating the residual lifetime of the leased component after the replacement left at the time of the renewal, and the index indicating the desired lease period after the renewal.

This configuration enables appropriate lease charges corresponding to a desired lease period after renewal of a lease agreement to be estimated even when a leased component that has reached the end of its lifetime during the lease period is replaced with a new leased component.

Further, when the lease agreement is concluded in which the desired lease period is longer than the residual lifetime of the leased component, the leased component that has reached the end of its lifetime during the lease period is replaced with a new leased component having the different price, and the lease agreement is renewed when the lease period ends, the estimate presentation device 110 calculates the markdown amount with respect to the lease charges after the renewal on the basis of at least the unit price of the leased component before the replacement, the index indicating the operation period of the leased component before the replacement during the lease period up to the renewal, and the lease charges before the renewal. Then, the estimate presentation device 110 estimates the lease charges after renewal on the basis of at least the unit price of the leased component after replacement, the index indicating the residual lifetime of the leased component after replacement left at the time of replacement, the index indicating the desired lease period after renewal, the index indicating the operation period of the leased component after replacement during the lease period up to renewal, and the markdown amount.

This configuration enables appropriate lease charges corresponding to a desired lease period after renewal of a lease agreement to be estimated even when a leased component that has reached the end of its lifetime during the lease period has been replaced with a new leased component and the unit price of the leased component has changed.

Further, the estimate presentation device 110 estimates a sales price of the leased component of the components of the gas turbine, when the leased component is sold without concluding a lease agreement. Then, the estimate presentation device 110 presents both the first estimate for the expenses associated with the gas turbine including the estimated lease charges, and the second estimate for the expenses associated with the gas turbine including the estimated sales price.

In sales of the gas turbine, this configuration can provide an estimate that aids in the determination of whether to purchase a component, which requires regular maintenance, of the components of the gas turbine, or to conclude the lease agreement for the component.

Figure 9:
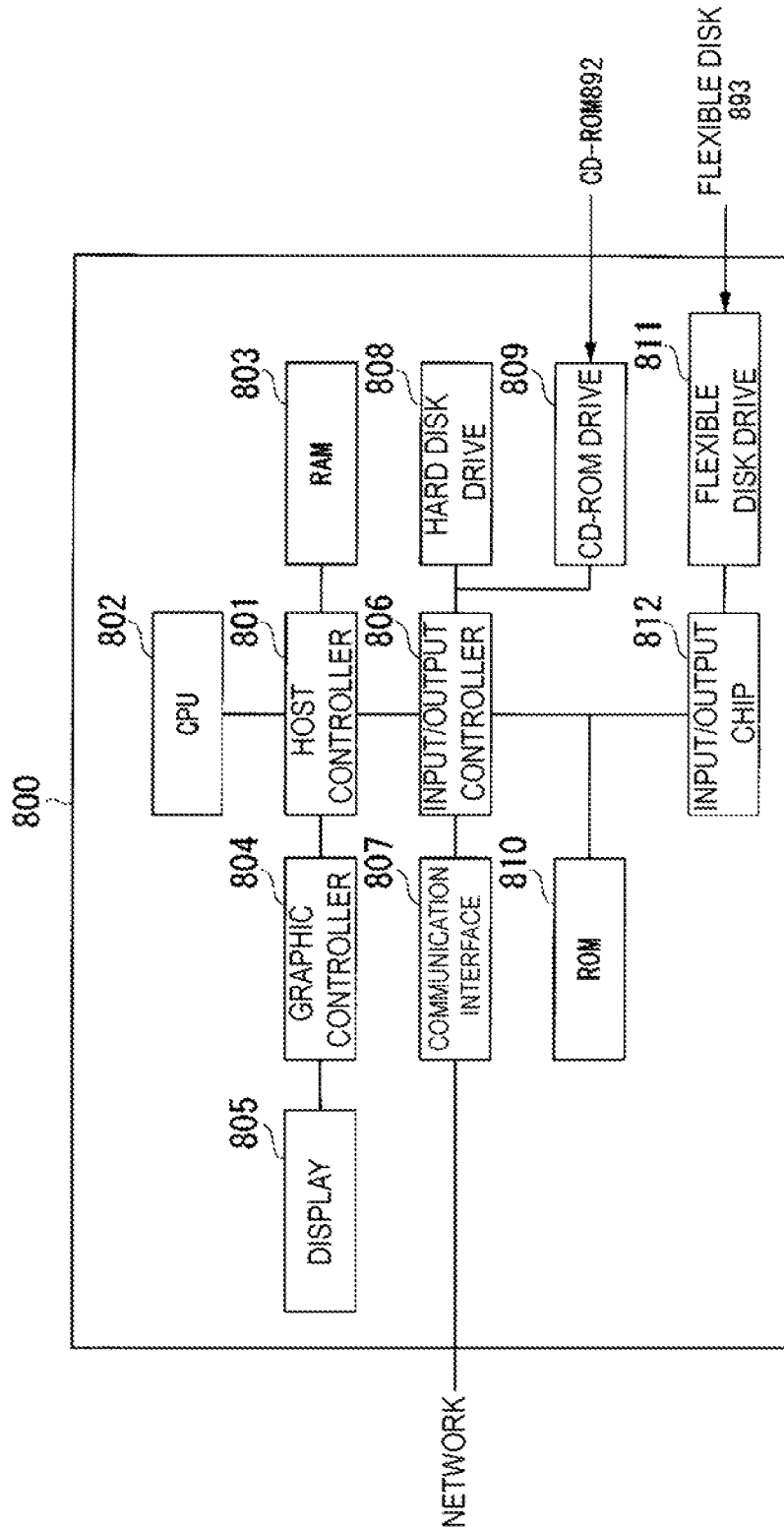
FIG. 9 is a diagram illustrating an example of a hardware configuration of a computer 800 constituting the estimate presentation device 110 according to the present embodiment.

FIG. 9 is a diagram illustrating an example of a hardware configuration of a computer 800 constituting the estimate presentation device 110 according to the present embodiment. The computer 800 according to the present embodiment is provided with: a central processing unit (CPU) peripheral part including a CPU 802, a random access memory (RAM) 803, a graphics controller 804, and a display 805 connected to each other by a host controller 801; an input/output part including a communication interface 807, a hard disk drive 808, and a compact disk read only memory (CD-ROM) drive 809 connected to each other by an input/output controller 806; and a legacy input/output part including a read only memory (ROM) 810, a flexible disk drive 811, and an input/output chip 812 connected to the input/output controller 806.

The host controller 801 connects the RAM 803 with the CPU 802 and the graphics controller 804 that access the RAM 803 at a high transfer rate. The CPU 802 operates on the basis of programs stored in the ROM 810 and the RAM 803 to control each unit. The graphics controller 804 acquires image data generated by the CPU 802 and the like on a frame buffer allocated in the RAM 803, and displays the image data on the display 805. Alternatively, the graphics controller 804 may internally include a frame buffer that stores the image data generated by the CPU 802 and the like.

The input/output controller 806 connects the host controller 801 with the communication interface 807 that is a relatively high-speed input/output device, the hard disk drive 808, and the CD-ROM drive 809. The hard disk drive 808 stores programs and data used by the CPU 802 in the computer 800. The CD-ROM drive 809 reads programs or data from a CD-ROM 892, and provides the read programs or data to the hard disk drive 808 via the RAM 803.

Further, the ROM 810, and the flexible disk drive 811 and the input/output chip 812 that are relatively low-speed input/output devices are connected to the input/output controller 806. The ROM 810 stores a boot program executed at the startup of the computer 800 and/or programs and the like that are dependent on the hardware of the computer 800. The flexible disk drive 811 reads programs or data from a flexible disk 893, and provides the read programs or data to the hard disk drive 808 via the RAM 803. As well as connecting the flexible disk drive 811 with the input/output controller 806, the input/output chip 812 connects various input/output devices with the input/output controller 806 via a parallel port, a serial port, a keyboard port, a mouse port, or the like.

The programs to be provided to the hard disk drive 808 via the RAM 803 are provided by a user with the programs stored in a recording medium, such as the flexible disk 893, the CD-ROM 892, or an integrated circuit (IC) card. The programs are read from the recording medium, installed in the hard disk drive 808 in the computer 800 via the RAM 803, and executed by the CPU 802.

Programs that are installed in the computer 800 and cause the computer 800 to function as the estimate presentation device 110 cause the computer 800 to function as: the lease charges estimating unit 113 that, when a lease agreement is concluded in which a component of components of the gas turbine which requires regular maintenance is to be leased as a leased component for a desired lease period, estimates the lease charges of the leased component at step S104; and the estimate presenting unit 116 that presents, at step S104, the estimate for the expenses associated with the gas turbine including the lease charges estimated by the lease charges estimating unit 113.

Further, the programs may cause the computer 800 to function as the lease charges estimating unit 113 that estimates the lease charges for the leased component on the basis of at least the unit price of the leased component, the index indicating the residual lifetime of the leased component, and the index indicating the desired lease period.

Further, the programs may cause the computer 800 to function as the lease charges estimating unit 113 that, when the lease agreement is concluded in which the desired lease period is longer than the residual lifetime of the leased component, the leased component that has reached the end of its lifetime during the lease period is replaced with a new leased component having the same price, and the lease agreement is renewed when the lease period ends, estimates the lease charges after the renewal of the lease agreement at step S205, on the basis of at least the unit price of the leased component after the replacement, the index indicating the residual lifetime of the leased component after the replacement left at the time of the renewal, and the index indicating the desired lease period after the renewal.

Further, the programs may cause the computer 800 to function as the markdown amount calculating unit 114 that, when the lease agreement is concluded in which the desired lease period is longer than the residual lifetime of the leased component, the leased component that has reached the end of its lifetime during the lease period is replaced with a new leased component having a different price, and the lease agreement is renewed when the lease period ends, calculates the markdown amount with respect to the lease charges after the renewal at step S204, on the basis of at least the unit price of the leased component before the replacement, the index indicating the operation period of the leased component before the replacement during the lease period up to the renewal, and the lease charges before the renewal. Further, the programs may cause the computer 800 to function as the lease charges estimating unit 113 that estimates the lease charges after the renewal at step S205, on the basis of at least the unit price of the leased component after the replacement, the index indicating the residual lifetime of the leased component after the replacement left at the time of the replacement, the index indicating the desired lease period after the renewal, the index indicating the operation period of the leased component after the replacement during the lease period up to the renewal, and the markdown amount calculated by the markdown amount calculating unit.

Further, the programs may cause the computer 800 to function as: the sales price estimating unit 115 that estimates, at step S104, the sales price of the leased component of the components of the gas turbine when the leased component is sold without concluding the lease agreement; and the estimate presenting unit 116 that presents, at step S105, both the first estimate for the expenses associated with the gas turbine including the lease charges estimated by the lease charges estimating unit and the second estimate for the expenses associated with the gas turbine including the sales price estimated by the sales price estimating unit.

Upon being read by the computer 800, information processing written in these programs function as: the estimate request data input receiving unit 111, the leased component specifying unit 112, the lease charges estimating unit 113, the markdown amount calculating unit 114, the sales price estimating unit 115, the estimate presenting unit 116, the gas turbine information storage unit 117, the component information storage unit 118, and the lease agreement information storage unit 119, which are specific means in which software and the above-described various hardware resources work together. Then, these specific means achieves calculations or processing on information in accordance with an object of use of the computer 800 according to the present embodiment, which constitutes the specific estimate presentation device 110 in accordance with the object of use.

For example, when the computer 800 communicates with an external device and the like, the CPU 802 executes a communication program loaded on the RAM 803, and, on the basis of processing content written in the communication program, instructs the communication interface 807 to perform communication processing. The communication interface 807 is controlled by the CPU 802 to read transmission data stored in a transmission buffer region or the like allocated on a storage device, such as the RAM 803, the hard disk drive 808, the flexible disk 893, or the CD-ROM 892, and transmit the read transmission data to a network. Alternatively, the communication interface 807 writes data received from the network into a reception buffer region or the like allocated on the storage device. In this way, the communication interface 807 may transfer the transmission and reception data to and from the storage device by direct memory access. Alternatively, the CPU 802 may read data from the storage device or the communication interface 807, which is a transfer source, and then write data into the communication interface 807 or the storage device which is a transfer destination, to transfer the transmission and reception data.

Further, the CPU 802 uses direct memory access transfer or the like to cause all or a necessary part of the data to be read into the RAM 803 from a file, a database, or the like stored in the external storage device, such as the hard disk drive 808, the CD-ROM 892, and the flexible disk 893, and then performs various processing on the data on the RAM 803. Then, the CPU 802 writes back the data, on which the processing has been performed, into the external storage device by the direct memory access transfer or the like.

In such processing, the RAM 803 temporarily holds content in the external storage device. Thus, in the present embodiment, the RAM 803, the external storage device, and the like are collectively referred to as a memory, a storage unit, or a storage device. The various pieces of information including the various programs, data, tables, databases, and the like according to the present embodiment are stored in such a storage device, and are subject to the information processing. Note that with a portion of data in the RAM 803 held on a cache memory, the CPU 802 can read and write the portion of data on the cache memory. Even in such a configuration, the cache memory is responsible for a part of the function of the RAM 803. Thus, in the present embodiment, excepting cases in which a distinction is made, the cache memory is included in the RAM 803, the memory and/or the storage device.

Further, the CPU 802 performs various processing on the data read out from the RAM 803, including the various calculations, processing on information, condition determinations, searching of information, substitutions, and the like described in the present embodiment that are specified by instruction sequences of the programs, and writes the data back into the RAM 803. For example, when performing a condition determination, the CPU 802 compares the various variables indicated in the present embodiment with other variables or constants to determine whether or not the variable satisfies a condition, such as being larger, smaller, equal or greater, equal or less, or equal. When the condition is satisfied, or when the condition is not satisfied, the CPU 802 causes the processing to branch into a different instruction sequence, or calls a sub routine.

Further, the CPU 802 can search for information stored in a file, a database, and the like in the storage device. For example, when a plurality of entries are stored in the storage device in which each of an attribute value of a first attribute and an attribute value of a second attribute are associated with each other, the CPU 802 can obtain the attribute value of the second attribute associated with the first attribute satisfying a predetermined condition by searching the plurality of entries stored in the storage device for an entry matching a condition in which the attribute value of the first attribute is specified and reading out the attribute value of the second attribute stored in that entry.

The programs or modules described above may be stored in an external recording medium. In addition to the flexible disk 893 and the CD-ROM 892, an optical recording medium, such as a digital versatile disk (DVD) and a compact disk (CD), a magneto-optical recording medium, such as a magneto-optical disk (MO), a tape medium, a semiconductor memory, such as an IC card, and the like can be used as the recording medium. Further, with a recording medium, such as a hard disk or a RAM provided in a server system connected to a dedicated communication network or the Internet, being used as the recording medium, the programs may be provided to the computer 800 via the network.

The present invention has been described using the above-described embodiment, but the technical scope of the present invention is not limited to the scope of the above-described embodiment. It is evident to persons skilled in the art that various changes or modifications can be made to the above-described embodiment. An aspect in which such changes or modifications have been made is also included in the technical scope of the present invention.

In an execution sequence of the processing, such as operations, procedures, steps, stages, and the like, in the systems, methods, devices, programs, and recording media indicated in the above-described embodiment, "before", "in advance" or the like is not particularly clarified, and it should be noted that, insofar as an output of previous processing is not used in the later processing, the processing can be implemented in a desired sequence. In relation to the operation flow in the above-described embodiment, even where the explanation is made using "first," "next," or the like for reasons of convenience, this does not mean that the execution must be carried out in this sequence.

INDUSTRIAL APPLICABILITY

According to the above-described estimate presentation device, estimate presentation method, program, and recording medium, in sales of a gas turbine, a purchaser can see the advantages of replacing a component with a manufacturer's specified component when the component has reached the end of its lifetime.

REFERENCE SIGNS LIST

110 Estimate presentation device
111 Estimate request data input receiving unit
112 Leased component specifying unit
113 Lease charges estimating unit
114 Markdown amount calculating unit
115 Sales price estimating unit
116 Estimate presenting unit
117 Gas turbine information storage unit
118 Component information storage unit
119 Lease agreement information storage unit
130 Input device
150 Output device
800 Computer
801 Host controller
802 CPU
803 RAM
804 Graphics controller
805 Display
806 Input/output controller
807 Communication interface
808 Hard disk drive
809 CD-ROM drive
810 ROM
811 Flexible disk drive
812 Input/output chip
892 CD-ROM
893 Flexible disk

The invention claimed is:

1. An estimate presentation device that presents an estimate for expenses associated with a gas turbine, the estimate presentation device comprising:

a component information storage unit that stores information on a plurality of components of the gas turbine;

a leased component specifying unit that specifies a leased component which is at least one of the plurality of components of the gas turbine and requires regular maintenance on the basis of the information stored in the component information storage unit;

a lease charges estimating unit that, when the leased component is specified by the leased component specifying unit, on an assumption that a lease agreement to lease the leased component for a desired period is concluded, automatically estimates lease charges for the leased component on the basis of at least a unit price of the leased component stored in the component information storage unit, an index indicating a residual lifetime of the leased component stored in the component information storage unit, and an index indicating the desired lease period, without a need for any operator intervention;

a sales price estimating unit that, when the leased component is specified by the leased component specifying unit, on an assumption that the lease component is purchased instead of concluding the lease agreement, automatically estimates a sales price of the leased component on the basis of the unit price of the leased component, without a need for any operator intervention; and an estimate presenting unit that presents both a first estimate for expenses associated with the gas turbine including the lease charges estimated by the lease charges estimating unit and a second estimate for the expenses associated with the gas turbine including the sales price estimated by the sales price estimating unit.

2. The estimate presentation device according to claim 1, wherein
the lease charges estimating unit estimates lease charges for a renewed lease agreement renewed at the expiration of a previous lease period of a previous lease agreement in which the previous lease period is longer than the residual lifetime of a first leased component which is at least one of the leased component and the first leased component has been replaced with a second leased component which is a new leased component and has the same price as the first leased component during the previous lease period, on the basis of at least the unit price of the second leased component, the index indicating a residual lifetime of the second leased component at the time of renewing the lease agreement, and an index indicating a new desired lease period.

3. The estimate presentation device according to claim 1, further comprising:
a markdown amount calculating unit that calculates a markdown amount with respect to lease charges for a renewed lease agreement renewed at the expiration of a previous lease period of a previous lease agreement in which the previous lease period is longer than the residual lifetime of a first leased component which is at least one of the leased component and the first leased component has been replaced with a second leased component which is a new leased component and has a different price from the first leased component during the previous lease period, on the basis of the unit price of the first leased component, an index indicating an operation period of the first leased component, and the lease charges for the previous lease agreement,
wherein the lease charges estimating unit estimates lease charges for the renewed lease agreement on the basis of at least the unit price of the second leased component, the index indicating the residual lifetime of the second leased component at the time of the replacement of the second leased component, an index indicating a new desired lease period, an index indicating an operation period of the second leased component during the previous lease period, and the markdown amount calculated by the markdown amount calculating unit.

4. An estimate presentation method for presenting an estimate for expenses associated with a gas turbine, the estimate presentation method comprising:
a leased component specifying step of specifying a leased component which is at least one of the plurality of components of the gas turbine and requires regular maintenance on the basis of information stored in a component information storage unit;
a lease charges estimating step of, when the leased component is specified in the leased component specifying step, on an assumption that a lease agreement to lease a leased component for a desired lease period is concluded, automatically estimating lease charges for the leased component on the basis of at least a unit price of the leased component, an index indicating a residual lifetime of the leased component and an index indicating a desired lease period, without a need for any operator intervention;
a sales price estimating step of, when the leased component is specified in the leased component specifying step, on an assumption that the lease component is purchased instead of concluding the lease agreement, automatically estimating a sales price of the leased component on the basis of the unit price of the leased component, without a need for any operator intervention, and
an estimate presenting step of presenting both a first estimate for expenses associated with the gas turbine including the lease charges estimated in the lease charges estimating step and a second estimate for the expenses associated with the gas turbine including the sales price estimated in the sales price estimating step.

5. A recording medium recording a program that causes a computer to function as an estimate presentation device for presenting an estimate for expenses associated with a gas turbine, the program causing the computer to function as:
a component information storage unit that stores information on a plurality of components of the gas turbine;
a leased component specifying unit that specifies a leased component which is at least one of the plurality of components of the gas turbine and requires regular maintenance on the basis of the information stored in the component information storage unit;
a lease charges estimating unit that, when the leased component is specified by the leased component specifying unit, on an assumption that a lease agreement to lease a leased component for a desired period is concluded, automatically estimates lease charges for the leased component on the basis of at least a unit price of the leased component, an index indicating a residual lifetime of the leased component and an index indicating a desired lease period, without a need for any operator intervention;
a sales price estimating unit that, when the leased component is specified by the leased component specifying unit, on an assumption that the lease component is purchased instead of concluding the lease agreement, automatically estimates a sales price of the leased component on the basis of the unit price of the leased component, without a need for any operator intervention; and
an estimate presenting unit that presents both a first estimate for expenses associated with the gas turbine including the lease charges estimated by the lease charges estimating unit and a second estimate for the expenses associated with the gas turbine including the sales price estimated by the sales price estimating unit.

* * * * *